United States Patent
Han et al.

(10) Patent No.: US 11,540,090 B2
(45) Date of Patent: Dec. 27, 2022

(54) METHOD AND APPARATUS FOR MULTICAST IN COMMUNICATION SYSTEM

(71) Applicant: Samsung Electronics Co., Ltd., Suwon-si (KR)

(72) Inventors: Kyuho Han, Seongnam-si (KR); Young-Sung Kho, Seongnam-si (KR); Joonseo Lee, Suwon-si (KR); Moonyoung Jeong, Seoul (KR); Giwon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 16/641,572

(22) PCT Filed: Dec. 15, 2017

(86) PCT No.: PCT/KR2017/014790
§ 371 (c)(1),
(2) Date: Sep. 4, 2020

(87) PCT Pub. No.: WO2019/039670
PCT Pub. Date: Feb. 28, 2019

(65) Prior Publication Data
US 2021/0029515 A1    Jan. 28, 2021

(30) Foreign Application Priority Data
Aug. 23, 2017  (KR) ........................ 10-2017-0106733

(51) Int. Cl.
*H04W 4/00* (2018.01)
*H04W 4/08* (2009.01)
(Continued)

(52) U.S. Cl.
CPC .............. *H04W 4/08* (2013.01); *H04W 76/11* (2018.02); *H04W 76/12* (2018.02); *H04L 12/189* (2013.01)

(58) Field of Classification Search
CPC ....... H04W 4/08; H04W 76/11; H04W 76/12; H04L 12/189; H04L 61/00; H04L 12/185; H04L 61/2592
See application file for complete search history.

(56) References Cited

U.S. PATENT DOCUMENTS

2006/0218262 A1* 9/2006 Abeta ................. H04L 65/1073
                                                         709/223
2014/0241352 A1   8/2014 Kollipara et al.
(Continued)

OTHER PUBLICATIONS

ISA/KR, International Search Report and Written Opinion of the International Searching Authority, International Application No. PCT/KR2017/014790, dated May 11, 2018, 11 pages.
(Continued)

*Primary Examiner* — Omoniyi Obayanju

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure is to provide a multicast service in a wireless communication system and comprises the steps of: receiving a multicast group participation message transmitted from a terminal via a communication session from a terminal to a first network entity; generating a multicast tunnel generation request message on the basis of the multicast group participation message, and transmitting the same to the first network entity; and generating a multicast service request message on the basis of the multicast group participation message, and transmitting the same to a second network entity. The present research is research that has
(Continued)

been conducted with the support of the "Cross-Departmental Giga KOREA Project" funded by the government (the Ministry of Science and ICT) in 2017 (No. GK17N0100, millimeter wave 5G mobile communication system development).

10 Claims, 10 Drawing Sheets

(51) Int. Cl.
*H04W 76/12* (2018.01)
*H04W 76/11* (2018.01)
*H04L 12/18* (2006.01)

(56) References Cited

U.S. PATENT DOCUMENTS

| | | |
|---|---|---|
| 2015/0334537 A1 | 11/2015 | Kathuria et al. |
| 2016/0173400 A1 | 6/2016 | Banavalikar et al. |
| 2016/0285932 A1 | 9/2016 | Thyamagundalu et al. |
| 2016/0352529 A1 | 12/2016 | Kotalwar et al. |
| 2016/0352531 A1* | 12/2016 | Shen, IV ............ H04L 12/4641 |
| 2017/0099156 A1 | 4/2017 | Qiu et al. |
| 2017/0195207 A1 | 7/2017 | Wanser et al. |

OTHER PUBLICATIONS

Qi, D., et al., "Software-Defined Multicast Network Overlay Framework," Internet-Draft submitted to IETF in conformance with provisional of BCP 78 and BCP 79, Jul. 3, 2017, 34 pages.

Communication pursuant to Article 94(3) EPC dated May 4, 2021 in connection with European Patent Application No. 17922449.8, 25 pages.

Notice of Preliminary Rejection dated Feb. 17, 2022, in connection with Korean Application No. 10-2017-0106733, 18 pages.

Supplementary European Search Report dated Jul. 28, 2020 in connection with European Patent Application No. 17 92 2449, 14 pages.

* cited by examiner

METHOD AND APPARATUS FOR MULTICAST IN COMMUNICATION SYSTEM

CROSS-REFERENCE TO RELATED APPLICATIONS

This application is a 371 National Stage of International Application No. PCT/KR2017/014790, filed Dec. 15, 2017, which claims priority to Korean Patent Application No. 10-2017-0106733 filed Aug. 23, 2017, the disclosures of which are herein incorporated by reference in their entirety.

BACKGROUND

1. Field

The disclosure relates generally to a communication system and, more particularly, to a method and an apparatus for implementing a multicast in a communication system.

This research is research that has been conducted with the support of the "Cross-Departmental Giga KOREA Project" funded by the Korean government (the Ministry of Science and ICT) in 2017 (No. GK17N0100, millimeter wave 5G mobile communication system development).

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

4G communication systems provide multimedia broadcast services for mobile terminals through evolved multimedia broadcast multicast services (eMBMS). As the development of various technologies enables a high data transmission rate, 5G communication systems are required to extend a service range in order not only to provide multimedia broadcast services for existing mobile terminals but also to provide multimedia broadcast services for a 5G fixed wireless access (FWA) environment.

SUMMARY

In view of the foregoing aspects, the disclosure provides a method and an apparatus for effectively implementing a multicast service in a wireless communication system.

Further, the disclosure provides a method and an apparatus for requesting a multicast service in a wireless communication system.

In addition, the disclosure provides a method and an apparatus for providing a multicast service in a wireless communication system.

According to various embodiments of the disclosure, an operating method of an apparatus for requesting a multicast service in a wireless communication system includes: receiving a multicast group participation message, transmitted from a terminal, through a communication session from the terminal to a first network entity; generating a multicast tunnel generation request message on the basis of the multicast group participation message to transmit the same to the first network entity; and generating a multicast service request message on the basis of the multicast group participation message to transmit the same to a second network entity.

According to various embodiments of the disclosure, an apparatus for requesting a multicast service in a wireless communication system includes: a transceiver configured to receive a multicast group participation message, transmitted from a terminal, through a communication session from the terminal to a first network entity; and a processor configured to generate a multicast tunnel generation request message on the basis of the multicast group participation message, to transmit the multicast tunnel generation request message to the first network entity, to generate a multicast service request message on the basis of the multicast group participation message, and to transmit the multicast service request message to a second network entity.

According to various embodiments of the disclosure, an operating method of an apparatus for providing a multicast service in a wireless communication system includes: receiving a multicast group participation message, transmitted from a terminal, through a communication session; analyzing and transmitting the multicast group participation message to a first network entity; receiving a multicast tunnel generation message based on the multicast group participation message from the first network entity; receiving multicast packets through a multicast tunnel generated to receive the multicast packets from a network apparatus on the basis of the multicast tunnel generation message; and transmitting the received packets to the terminal through the communication session.

According to various embodiments of the disclosure, an apparatus for providing a multicast service in a wireless communication system includes: a transceiver configured to receive a multicast group participation message, transmitted from a terminal, through a communication session; and a processor configured to analyze and transmit the multicast group participation message to a first network entity, to receive multicast packets through a multicast tunnel generated to receive the multicast packets from a network apparatus on the basis of a multicast tunnel generation message based on the multicast group participation message upon receiving the multicast tunnel generation message from the first network entity, and to transmit the received packets to the terminal through the communication session.

An apparatus and a method according to various embodiments of the disclosure may implement a multicast service using software-defined networking (SDN) in a communication system, thereby improving the availability of existing infrastructure and efficiently implementing a multicast service with enhanced resource efficiency.

Effects which can be acquired by the disclosure are not limited to the above described effects, and other effects that have not been mentioned may be clearly understood by those skilled in the art from the following description.

DETAILED DESCRIPTION

Figure 1:
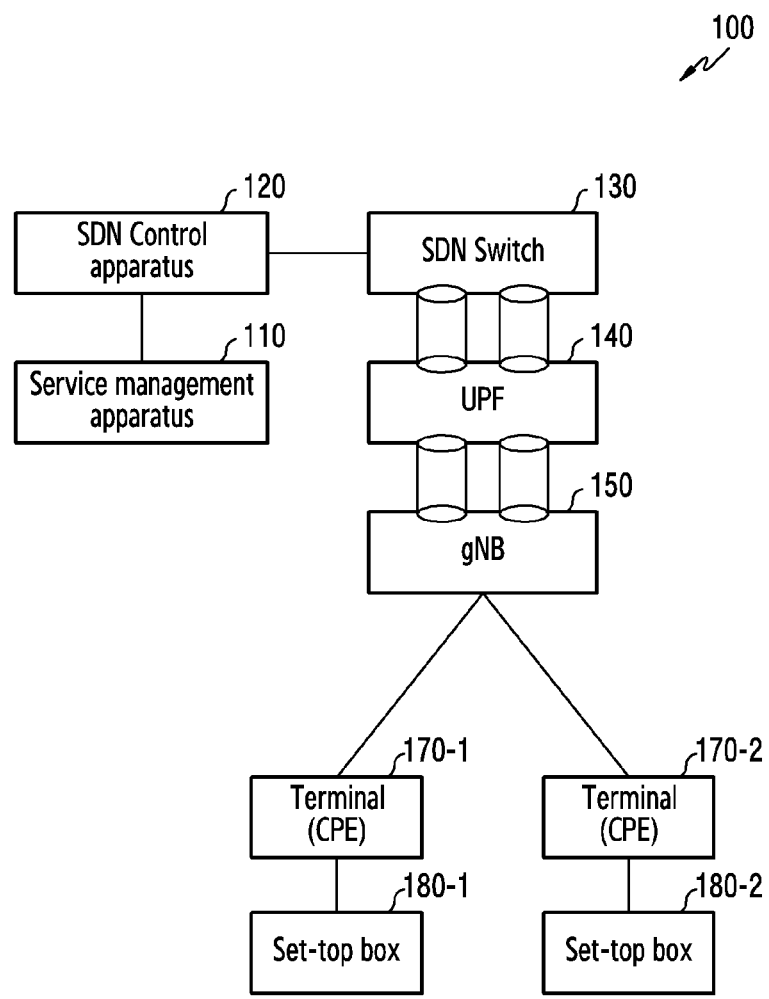
FIG. 1 illustrates a communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The disclosure illustrated below relates to an apparatus and a method for providing a multicast service in a wireless communication system. Specifically, the disclosure illustrates a technology for providing a multicast service using a software-defined network (SDN) in a wireless communication system. A multicast service to be provided in the disclosure includes a service providing, through a wireless communication system, various types of multimedia content, such as television, video, audio, and text, provided in a packet through a multicast-based content provider, for example, an Internet Protocol television (IPTV). As used herein, terms related to various communication protocols, terms referring to network entities, terms referring to components of a device (properly modified depending on the disclosure), and the like are used for convenience of description. Therefore, the disclosure is not limited by the following terms, and other terms having equivalent technical meanings may be used.

As used herein, terms referring to information (e.g., an identifier (ID), a tunnel ID, an Internet Protocol (IP) address, a session ID, a tunnel IP, and a multicast IP), terms referring to network entities (e.g., a settop, a terminal, a node, and an apparatus), terms referring to messages (e.g. a signal, data, a packet, a report, a response, and a request), terms referring to components of a device (e.g., a controller and a sensor), and the like are used for convenience of description. Therefore, the disclosure is not limited by the following terms, and other terms having equivalent technical meanings may be used.

Further, although the disclosure illustrates various embodiments using terms used in some communication standards (e.g., 3rd Generation Partnership Project (3GPP)), these standards are provided merely for convenience of description. Various embodiments of the disclosure may be easily modified and applied to other communication systems.

Hereinafter, terms used in the disclosure are defined as follows.

Software-defined networking (SDN) refers to a technology for separating a control area from individual network elements (NEs) forming a network as an accessible apparatus and enabling the accessible apparatus to logically control and manage the network using an application. In SDN, each individual NE may be programmed via an open application programming interface (API), thus being controlled or managed. That is, SDN enables the network and/or the NEs to be managed in a centralized manner.

FIG. 1 illustrates a communication system 100 according to various embodiments of the disclosure. Referring to FIG. 1, the system 100 for providing a multicast service (or simply "system" 100) includes a service management apparatus (multicast service management function (SMF)) 110, a software-defined networking (SDN) controller 120, an SDN switch 130, a gateway (multicast user-plane function: UPF) 140, and a base station (gNodeB or eNodeB) 150. The communication system may further include a user apparatus or a terminal 170-1 or 170-2. Each of the terminal 170-1 and the terminal 170-2 may be connected via a cable or wirelessly with an apparatus 180-1 or 180-2, for example, a set-top box, which receives and provides multimedia content, such as a terrestrial, cable, or satellite broadcast, through a cable, such as a telephone line or a dedicated line, thus communicating therewith. Hereinafter, for convenience, the apparatus 180-1 and the apparatus 180-2 are referred to as set-top boxes.

The service management apparatus 110, which is a network entity (NE) or a network function (NF) of a control plane, manages a session and allocates IP addresses of the terminal 170-1 and the terminal 170-2 in the communication system 100. The service management apparatus 110 selects and controls the gateway 140 for data transmission. In addition, the service management apparatus 110 performs a service management function, such as routing path management, billing information generation, and quality of service (QoS) control, for supporting the mobility of a terminal. The service management apparatus 110 also performs a multicast service management function according to various embodiments.

The SDN control apparatus 120 communicates with the service management apparatus 110, thereby controlling and managing the SDN switch 130. The SDN control apparatus 120 provides functions for controlling other apparatuses in the network, particularly SDN switch-related settings/functions. The SDN control apparatus 120 may be configured, for example, in a general-purpose server, and may perform various roles according to programs/applications to be installed.

The SDN switch 130 is a network apparatus that is connected to the SDN control apparatus 120 to transmit data to other apparatuses (e.g., the terminal 170-1 and the terminal 170-2) in the communication system 100. The SDN switch 130 performs tunneling for multicast packet forwarding to the gateway 140 under the control of the SDN control apparatus 120. The SDN control apparatus 120 and the SDN switch 130 may include at least one application having an open API and may communicate with a different apparatus through the at least one application. In the following description, an SDN control apparatus may be referred to as a controller, and an SDN switch may be referred to as a switch.

The gateway 140, which is a network entity (NE) or a network function (NF) of a user plane, functions to forward packets transmitted from the terminal 170-1 and the terminal 170-2 or packets transmitted to the terminal 170-1 and the terminal 170-2. Further, the gateway 140 applies QoS or controls traffic flow through packet priority control, rate limiting, QoS marking, packet inspection, or downlink buffering. According to various embodiments, the gateway 140 also performs a tunneling function for providing a multicast service to the terminal 170-1 and the terminal 170-2.

The gateway 140 may be disposed close to the terminals in order to reduce round-trip time (RTT) for bidirectional communication via a data network with the terminal 170-1 and the terminal 170-2 and may be configured as a plurality of apparatuses on a suitable platform, such as a cloud infrastructure.

The base station 150 is a network infrastructure that provides wireless access for the terminal 170-1 or 170-2. The base station 150 has coverage defined as a certain geographic area based on the distance over which the base station 150 can transmit a signal. The base station 150 may be referred to as an access point (AP), an eNodeB (eNB), a 5th-generation (5G) node, a wireless point, a transmission/reception point (TRP), or other terms with equivalent technical meanings, in addition to a base station. Although FIG. 1 illustrates only one base station, a different base station equivalent or similar to the base station 150 may be further included.

Each of the terminal 170-1 and the terminal 170-2 is an apparatus used by a user and communicates with the base station 150 through a wireless channel. In some cases, at least one of the terminal 170-1 and the terminal 170-2 may be operated without a user's involvement. For example, at least one of the terminal 170-1 and the terminal 170-2 may be an apparatus performing machine-type communication (MTC) and may not be carried by a user. Each of the terminal 170-1 and the terminal 170-2 may be referred to as a user equipment (UE), a mobile station, a subscriber station, a customer-premises equipment (CPE), a remote terminal, a wireless terminal, an electronic device, a user device, or other terms with equivalent technical meanings in addition to a terminal.

The base station 150, the terminal 170-1, and the terminal 170-2 may transmit and receive radio signals in a millimeter wave (mmWave) band (e.g., 28 GHz, 30 GHz, 38 GHz, or 60 GHz). Here, the base station 150, the terminal 170-1, and the terminal 170-2 may perform beamforming in order to improve channel gain. Here, the beamforming may include transmission beamforming and reception beamforming. That is, the base station 150, the terminal 170-1, and the terminal 170-2 may assign directivity to a transmission signal or a reception signal. To this end, the base station 150 and the terminals 170-1 and 170-2 may select serving beams (not shown) through a beam search or beam management procedure. After the serving beams (not shown) are selected, communication may then be performed through a resource in a quasi co-located (QCL) relationship with a resource for transmitting the serving beams (not shown).

As described above, the service management apparatus 110, the SDN control apparatus 120, the gateway 140, and the like are described herein as device elements but are not limited thereto. The service management apparatus 110, the SDN control apparatus 120, the gateway 140, and the like may be configured as network components on dedicated hardware or as software instances on dedicated hardware or may be configured by virtualizing functions thereof on a suitable platform, such as a cloud infrastructure. Further, in some cases, particular functions or different functions of the service management apparatus 110, the SDN control apparatus 120, the gateway 140, and the like may be configured in separate pieces of hardware, or two or more thereof may be integrated to be configured in one or more pieces of hardware.

Figure 2:
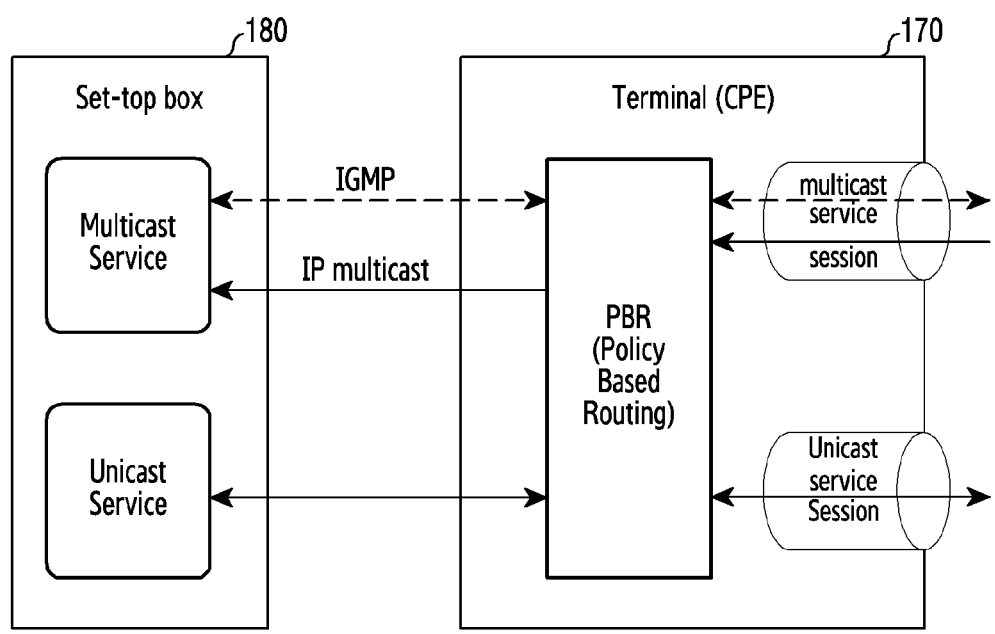
FIG. 2 illustrates a structure for requesting multicast participation in a communication system according to various embodiments of the disclosure.

FIG. 2 illustrates a structure for requesting multicast participation in a communication system according to various embodiments of the disclosure.

A set-top box 180 is an apparatus corresponding to the set-top box 180-1 and the set-top box 180-2 of FIG. 1 and is an Internet Protocol television (IPTV) receiver, which provides a service through a service provider-specific protocol based on IP multicast. The set-top box 180 may report an event or a change to a network using a protocol for multicast membership group management for a local network or subnet, for example, an Internet group management protocol (IGMP).

The set-top box 180 may request a multicast service using an IGMP message. To request a multicast service, the set-top box 180 generates and transmits an IGMP message (e.g., a membership report) including information about a group to join among a plurality of multicast groups, for example, a specific multicast IP address (e.g., a 32-bit IPv4 multicast group address).

A terminal 170 is an apparatus corresponding to the terminal 170-1 and the terminal 170-2 of FIG. 1 and may be installed, for example, indoors to connect various communication devices with a service of a communication service provider through a local area network (LAN) and to relay communication between the communication devices and the base station.

The terminal 170 generates at least one communication session on the basis of communication session information, and transmits and receives IP packets through the generated communication session. The terminal 170 may, for example, separately operate a multicast service session for a multicast service and a unicast session for a unicast service and may provide a session, for example, using a separate port. In this case, the terminal 170 may determine a communication session and perform routing on the basis of communication session information, such as policy-based routing (PBR), predetermined for routing various IP packets. Alternatively, the terminal 170 may operate a multicast session and a unicast session without division.

The terminal 170 receives an IGMP message from the set-top box 180 and transmits the IGMP message to a gateway 140 through the base station 150. Here, when the terminal separately operates a multicast service session and a unicast service session, the terminal may generate a multicast service session, for example, on the basis of PBR and may transmit the IGMP message to the gateway 140 through this session.

When the terminal 170 operates a multicast session and a unicast session without division, the terminal 170 may arbitrarily generate a session for communication with the gateway 140 and may transmit the IGMP message to the gateway 140 through this session. Hereinafter, a communication session generated to transmit an IGMP message is referred to as a multicast session for convenience.

Figure 3:
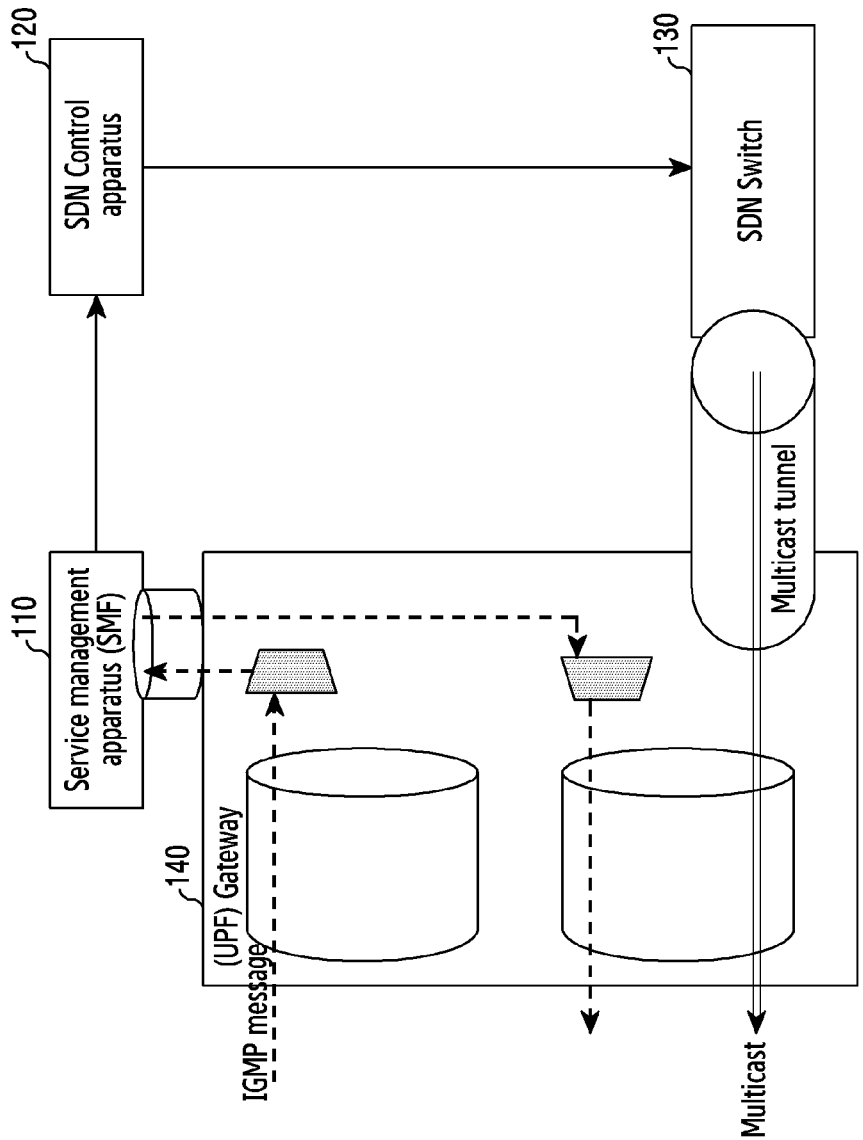
FIG. 3 illustrates a structure for processing a multicast participation request in a communication system according to various embodiments of the disclosure.

FIG. 3 illustrates a structure for processing a multicast participation request in a communication system according to various embodiments of the disclosure.

Upon receiving an IGMP message transmitted from a terminal 170 via a base station 150 through a multicast session, a gateway 140 snoops on the IGMP message. To this end, the gateway 140 has an IGMP protocol analysis function. Accordingly, the gateway 140 may determine that the terminal 170 requests multicast traffic for a multicast IP group corresponding to a multicast IP address.

The gateway 140 may generate an uplink (UL) filter for snooping on the IGMP message when generating a communication session or a multicast session for transmitting the IGMP message. Accordingly, the gateway 140 may insert the analyzed IGMP message as content of a signaling message between the gateway 140 and a service management apparatus 110 and may transmit the IGMP message, along with the ID of the multicast session for transmitting the IGMP message, to the service management apparatus 110 through an uplink. Here, the gateway 140 may record, for example, a communication session ID (or port ID) with the terminal 170 and the multicast IP address in a table, for example, an IGMP snoop table.

The service management apparatus 110 generates a multicast tunnel for transmitting multicast IP packets, received in the multicast group, to the gateway 140 through an SDN switch 130 in response to a request for participation in the multicast group corresponding to the multicast IP address included in the IGMP message. The service management apparatus 110 may map the multicast tunnel terminating at the gateway 140, for example, to a downlink (DL) of the multicast session in which the IGMP message for requesting the participation in the multicast group is received.

The service management apparatus 110 transmits information about the generation of the multicast tunnel to the SDN control apparatus 120. For example, the service management apparatus 110 may generate a service rule for transmitting a multicast IP packet on the basis of information including the ID of the generated multicast tunnel, information about the mapped multicast session, and the multicast IP address and may transmit the service rule to the SDN control apparatus 120.

The SDN control apparatus 120 receives the information about the generation of the multicast tunnel for transmitting the IP packet from the service management apparatus 110, controls the SDN switch 130 accordingly to generate the multicast tunnel from the SDN switch 130 to the gateway 140, and transmits the multicast IP packets designated to the multicast IP address of the multicast group of the participation request to the gateway 140 through the generated multicast tunnel.

Figure 4:
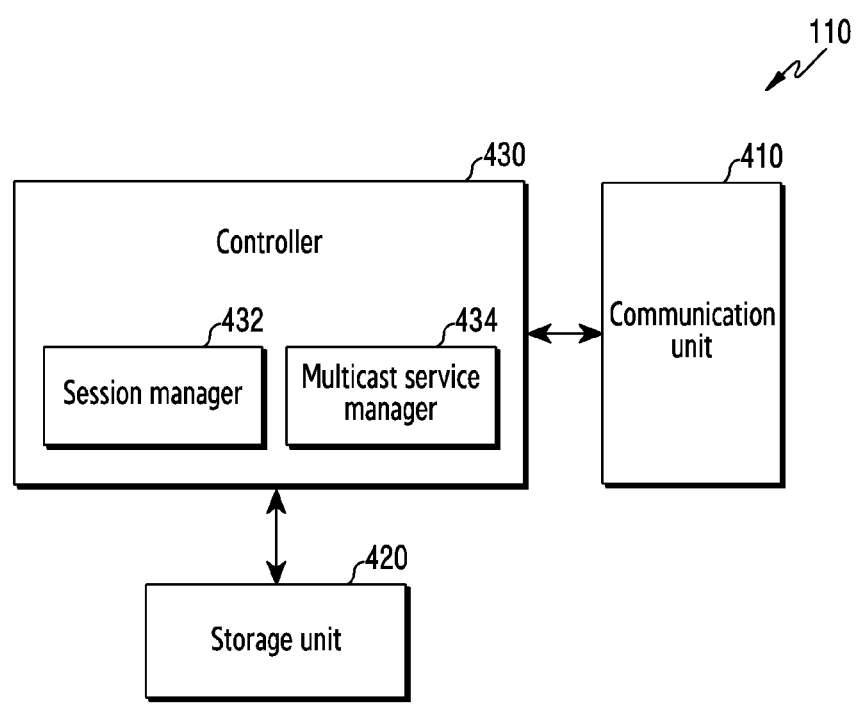
FIG. 4 illustrates the configuration of a service management apparatus (service management function) in a communication system according to various embodiments of the disclosure.

FIG. 4 illustrates the configuration of a service management apparatus in a communication system according to various embodiments of the disclosure.

The configuration illustrated in FIG. 4 may be understood as the configuration of the service management apparatus 110. The terms 'unit,' '-or/er,' and the like used herein indicate a unit for processing at least one function or operation, which may be implemented by hardware, software, or a combination thereof.

Referring to FIG. 4, the service management apparatus 110 includes a communication unit 410, a storage unit 420, and a controller 430.

The communication unit 410 may perform functions for transmitting or receiving a signal through a wireless channel. The communication unit 410 may perform a function of conversion between a baseband signal and a bit stream according to the physical layer specification of a system. For example, in data transmission, the communication unit 410 may encode and modulate a transmitted bit stream to generate complex symbols. In another example, in data reception, the communication unit 410 may demodulate and decode a baseband signal to reconstruct a received bit stream.

The communication unit 410 provides an interface for performing communication with other apparatuses or nodes in the communication system. That is, the communication unit 410 converts a bit stream, which is transmitted from the service management apparatus 110 to another apparatus, for example, a gateway, an SDN control apparatus, a core network, or the like, into a physical signal, and converts a physical signal, which is received from the other apparatus, into a bit stream. That is, the communication unit 410 may transmit and receive signals. Accordingly, the communication unit 410 may be referred to as a transmitter, a receiver, or a transceiver.

The communication unit 410 enables the service management apparatus 110 to communicate with other apparatuses or systems via a backhaul connection or via a network. The communication unit 410 may support communication through an appropriate wired or wireless connection. For example, when the service management apparatus 110 is configured as a part of a mobile communication system (to support 5G, LTE, or LTE-A), the communication unit 410 may enables the service management apparatus 110 to communicate with other apparatuses via a wired or wireless backhaul connection. When the service management apparatus 110 is configured as an access point, the communication unit 410 may enable the service management apparatus 110 to communicate via a wired or wireless local area network or through a larger-scale network (such as the Internet) via a wired or wireless connection. The communication unit 410 may include a structure for supporting communication via a wired or wireless connection, such as an Ethernet or RF transceiver.

The storage unit 420 may store a control instruction code, control data, or user data to control the service management apparatus 110. For example, the storage unit 420 may include an application, an operating system (OS), middleware, and a device driver. The storage unit 420 may include at least one of a volatile memory or a non-volatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read-only memory (ROM), a programmable ROM (PROM), an electrically programmable ROM (EPROM), an electrically erasable ROM (EEPROM), a flash memory, and the like. The storage unit 420 may include a non-volatile medium, such as a hard disk drive (HDD), a solid state disk (SSD), an embedded MultiMediaCard (eMMC), and a universal flash storage (UFS). The storage unit 420 may be operatively coupled to the controller 430.

The controller 430 may control the overall operations of the service management apparatus 110. For example, the controller 430 may transmit or receive a signal through the communication unit 410. The controller 430 may record data in the storage unit 420 and may read data recorded in the storage unit 420. To this end, the controller 430 may include at least one processor or at least one microprocessor. The controller 430 may be configured to implement an operation procedure and/or methods of the service management apparatus 110 proposed in the disclosure. The controller 430 may control the service management apparatus 110 to perform operations associated with provision of a multicast service according to various embodiments described above or to be described below.

Further, the controller 430 records and reads data in the storage unit 420. The controller 430 may perform at least functions a protocol stack required in a communication standard. To this end, the controller 430 may include at least one processor. According to various embodiments, the controller 430 includes a session manager 432 to generate a session for communication with a gateway 140, to receive a signaling message including an IGMP message through this session, and to parse and analyze the message and a multicast service manager 434 to receive session information and a multicast IP address from the session manager and to generate information about generation of a multicast tunnel. Here, the session manager 432 and the multicast service manager 434 are instruction sets or codes stored in the storage unit 420 and may be instructions/codes at least temporarily residing in the controller 430, storage spaces storing an instruction/code, or part of circuitry forming the controller 430.

Figure 5:
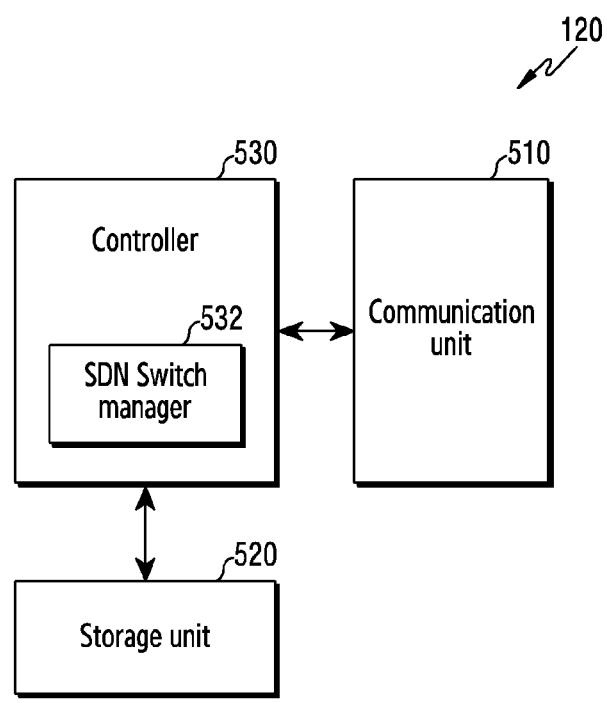
FIG. 5 illustrates the configuration of a software-defined network (SDN) control apparatus in a communication system according to various embodiments of the disclosure.

FIG. 5 illustrates the configuration of an SDN control apparatus in a communication system according to various embodiments of the disclosure.

The configuration illustrated in FIG. 5 may be understood as the configuration of the SDN control apparatus 120. The terms 'unit,' '-or/er,' and the like used herein indicate a unit for processing at least one function or operation, which may be implemented by hardware, software, or a combination thereof.

Referring to FIG. 5, the SDN control apparatus 120 includes a communication unit 510, a storage unit 520, and a controller 530.

The communication unit 510 may perform functions for transmitting or receiving a signal through a wireless channel. The communication unit 510 may perform a function of conversion between a baseband signal and a bit stream according to the physical layer specification of a system. For example, in data transmission, the communication unit 510 may encode and modulate a transmitted bit stream to generate complex symbols. In another example, in data reception, the communication unit 510 may demodulate and decode a baseband signal to reconstruct a received bit stream.

The communication unit 510 provides an interface for performing communication with other apparatuses or nodes in the communication system. That is, the communication unit 510 converts a bit stream, which is transmitted from the SDN control apparatus 120 to another apparatus, for example, a service management apparatus, an SDN switch, a core network, or the like, into a physical signal, and converts a physical signal, which is received from the other apparatus, into a bit stream. That is, the communication unit 510 may transmit and receive signals. Accordingly, the communication unit 510 may be referred to as a transmitter, a receiver, or a transceiver.

The communication unit 510 enables the SDN control apparatus 120 to communicate with other apparatuses or systems via a backhaul connection or via a network. The communication unit 510 may support communication through an appropriate wired or wireless connection. For example, when the SDN control apparatus 120 is configured as a part of a mobile communication system (to support 5G, LTE, or LTE-A), the communication unit 510 may enables the SDN control apparatus 120 to communicate with other apparatuses via a wired or wireless backhaul connection. When the SDN control apparatus 120 is configured as an access point, the communication unit 510 may enable the SDN control apparatus 120 to communicate via a wired or wireless local area network or through a larger-scale network (such as the Internet) via a wired or wireless connection. The communication unit 510 may include a structure for supporting communication via a wired or wireless connection, such as an Ethernet or RF transceiver.

The storage unit 520 may store a control instruction code, control data, or user data to control the SDN control apparatus 120. For example, the storage unit 520 may include an application, an operating system (OS), middleware, and a device driver. The storage unit 520 may include at least one of a volatile memory or a non-volatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read-only memory (ROM), a programmable ROM (PROM), an electrically programmable ROM (EPROM), an electrically erasable ROM (EEPROM), a flash memory, and the like. The storage unit 520 may include a non-volatile medium, such as a hard disk drive (HDD), a solid state disk (SSD), an embedded MultiMediaCard (eMMC), and a universal flash storage (UFS). The storage unit 520 may be operatively coupled to the controller 530.

The controller 530 may control the overall operations of the SDN control apparatus 120. For example, the controller 530 may transmit or receive a signal through the communication unit 510. The controller 530 may record data in the storage unit 520 and may read data recorded in the storage unit 520. To this end, the controller 530 may include at least one processor or at least one microprocessor. The controller 530 may be configured to implement an operation procedure and/or methods of the SDN control apparatus 120 proposed in the disclosure. The controller 530 may control the SDN control apparatus 120 to perform operations associated with provision of a multicast service according to various embodiments described above or to be described below.

Further, the controller 530 records and reads data in the storage unit 520. The controller 530 may perform at least functions a protocol stack required in a communication standard. To this end, the controller 530 may include at least one processor. According to various embodiments, the controller 530 includes an SDN switch manager 532 to control an SDN switch f according to service rules for transmitting a multicast IP packet received from a service management apparatus 110. The SDN switch manager 532 transmits a multicast tunnel ID and information about a mapped multicast session to an SDN switch 130 to generate a multicast tunnel between the SDN switch and a gateway 140. Further, the SDN switch manager 532 enables corresponding multicast IP packets to be transmitted through the generated multicast tunnel on the basis of information including a multicast IP address. Here, the SDN switch manager 532 is an instruction set or code stored in the storage unit 520 and may be an instruction/code at least temporarily residing in the controller 530, a storage space storing an instruction/code, or part of circuitry forming the controller 530.

Figure 6:
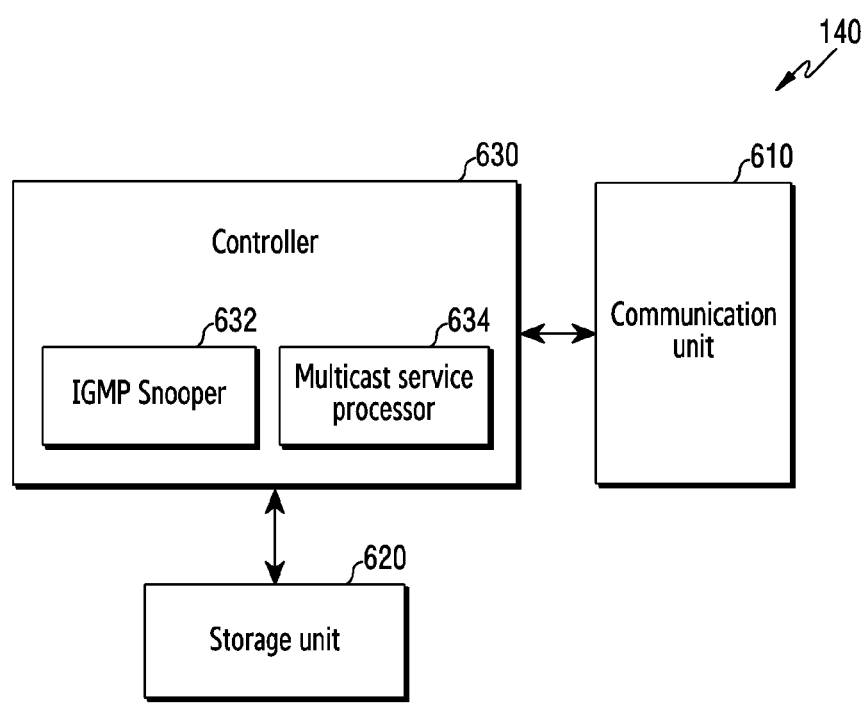
FIG. 6 illustrates the configuration of a gateway (user-plane function) in a communication system according to various embodiments of the disclosure.

FIG. 6 illustrates the configuration of a gateway (user-plane function) in a communication system according to various embodiments of the disclosure.

The configuration illustrated in FIG. 6 may be understood as the configuration of the gateway 140. The terms 'unit,' '-or/er,' and the like used herein indicate a unit for processing at least one function or operation, which may be implemented by hardware, software, or a combination thereof.

Referring to FIG. 6, the gateway 140 includes a communication unit 610, a storage unit 620, and a controller 630.

The communication unit 610 may perform functions for transmitting or receiving a signal through a wireless channel. The communication unit 610 may perform a function of conversion between a baseband signal and a bit stream according to the physical layer specification of a system. For example, in data transmission, the communication unit 610 may encode and modulate a transmitted bit stream to generate complex symbols. In another example, in data reception, the communication unit 610 may demodulate and decode a baseband signal to reconstruct a received bit stream.

The communication unit 610 provides an interface for performing communication with other apparatuses or nodes in the communication system. That is, the communication unit 610 converts a bit stream, which is transmitted from the gateway 140 to another apparatus, for example, a base station, a service management apparatus, a core network, or the like, into a physical signal, and converts a physical signal, which is received from the other apparatus, into a bit stream. That is, the communication unit 610 may transmit and receive signals. Accordingly, the communication unit 610 may be referred to as a transmitter, a receiver, or a transceiver.

The communication unit 610 enables the gateway 140 to communicate with other apparatuses or systems via a backhaul connection or via a network. The communication unit 610 may support communication through an appropriate wired or wireless connection. For example, when the gateway 140 is configured as a part of a mobile communication system (to support 5G, LTE, or LTE-A), the communication unit 610 may enables the gateway 140 to communicate with other apparatuses via a wired or wireless backhaul connection. When the gateway 140 is configured as an access point, the communication unit 610 may enable the gateway 140 to communicate via a wired or wireless local area network or through a larger-scale network (such as the Internet) via a wired or wireless connection. The communication unit 610 may include a structure for supporting communication via a wired or wireless connection, such as an Ethernet or RF transceiver.

The storage unit 620 may store a control instruction code, control data, or user data to control the gateway 140. For example, the storage unit 620 may include an application, an operating system (OS), middleware, and a device driver. The storage unit 620 may include at least one of a volatile memory or a non-volatile memory. The volatile memory may include a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read-only memory (ROM), a programmable ROM (PROM), an electrically programmable ROM (EPROM), an electrically erasable ROM (EEPROM), a flash memory, and the like. The storage unit 620 may include a non-volatile medium, such as a hard disk drive (HDD), a solid state disk (SSD), an embedded MultiMediaCard (eMMC), and a universal flash storage (UFS). The storage unit 620 may be operatively coupled to the controller 630.

The controller 630 may control the overall operations of the gateway 140. For example, the controller 630 may transmit or receive a signal through the communication unit 610. The controller 630 may record data in the storage unit 620 and may read data recorded in the storage unit 620. To this end, the controller 630 may include at least one processor or at least one microprocessor. The controller 630 may be configured to implement an operation procedure and/or methods of the gateway 140 proposed in the disclosure. The controller 630 may control the gateway 140 to perform operations associated with provision of a multicast service according to various embodiments described above or to be described below.

Further, the controller 630 records and reads data in the storage unit 620. The controller 630 may perform at least functions a protocol stack required in a communication standard. To this end, the controller 630 may include at least one processor. According to various embodiments, the controller 630 includes an IGMP snooper 632 to interpret control information included in a header of an IGMP message packet and a multicast service processor 634 to transmit an IGMP message to a service management apparatus 110 by inserting the interpreted IGMP message into a payload of a signaling message packet, to receive a multicast IP packet through a multicast tunnel, and to transmit the multicast IP packet to a terminal 170, a terminal 170-1, or a terminal 1702. Here, the IGMP snooper 632 and the multicast service processor 634 are instruction sets or codes stored in the storage unit 620 and may be instructions/codes at least temporarily residing in the controller 630, storage spaces storing an instruction/code, or part of circuitry forming the controller 630.

Figure 7:
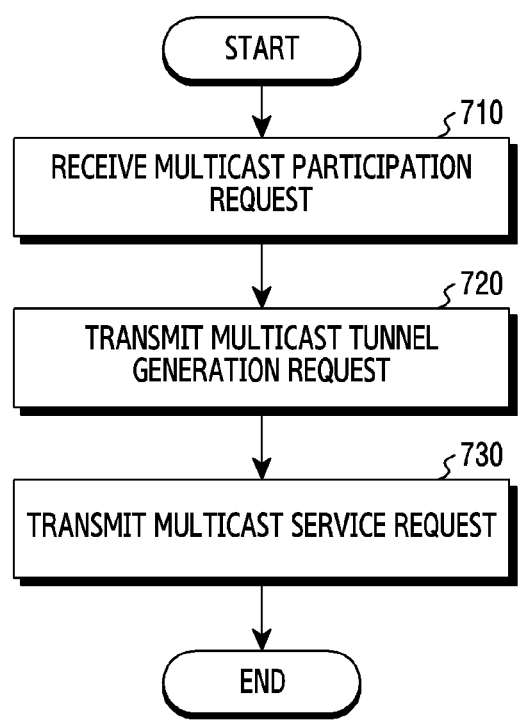
FIG. 7 illustrates the flow of an operation of requesting a multicast service in a communication system according to various embodiments of the disclosure.

FIG. 7 illustrates the flow of an operation of a service management apparatus for providing a multicast service in a communication system according to various embodiments of the disclosure.

In operation 710, the service management apparatus receives a multicast group participation message from a terminal 170, a terminal 170-1, or a terminal 170-2 via a communication session for a gateway 140. The service management apparatus 110 analyzes the multicast group participation message transmitted via the communication session. Accordingly, the service management apparatus 110 may manage whether to provide a multicast service to a terminal requesting participation in a multicast group, billing information about the terminal, and authentication of the terminal. Further, the service management apparatus 110 may obtain information, such as a communication session ID and a participation request multicast IP address related to the requested participation, through the analysis of the multicast group participation message.

In operation 720, the service management apparatus 110 generates a multicast tunnel generation request message. The multicast tunnel generation request message may include, for example, a multicast tunnel ID and a multicast tunnel IP address. To this end, the service management apparatus may generate the multicast tunnel ID and may designate the IP address of a multicast port of the gateway 140 as the terminating IP address of a multicast tunnel, that is, the multicast tunnel IP address. The multicast tunnel generation request message may further include the ID of the communication session. The service management apparatus 110 may transmit the generated multicast tunnel generation request message to the gateway 140 and may receive a response thereto.

Accordingly, in operation 730, the service management apparatus 110 generates a multicast tunnel between an SDN switch 130 and the gateway 140 and requests a multicast service through an SDN control apparatus 120 to provide the multicast service to the terminal.

To this end, the service management apparatus 110 may generate a multicast service request message including the multicast tunnel ID and the multicast tunnel IP address. The multicast service request message may include a multicast IP address.

The service management apparatus 110 transmits the multicast service request message to the SDN control apparatus 120. Accordingly, the SDN control apparatus 120 controls the SDN switch 130 on the basis of the multicast service request message, generates the multicast tunnel from the SDN switch 130 to the gateway 140, and enables the SDN switch 130 to transmit multicast IP packets corresponding to the multicast IP address to the gateway 140 through the generated multicast tunnel. The gateway 140 generates the multicast tunnel on the basis of the multicast tunnel generation request message, and transmits the multicast IP packets received through this tunnel to the terminal transmitting the multicast group participation message by mapping the multicast IP packets to the communication session via which the multicast group participation message is received.

Figure 8:
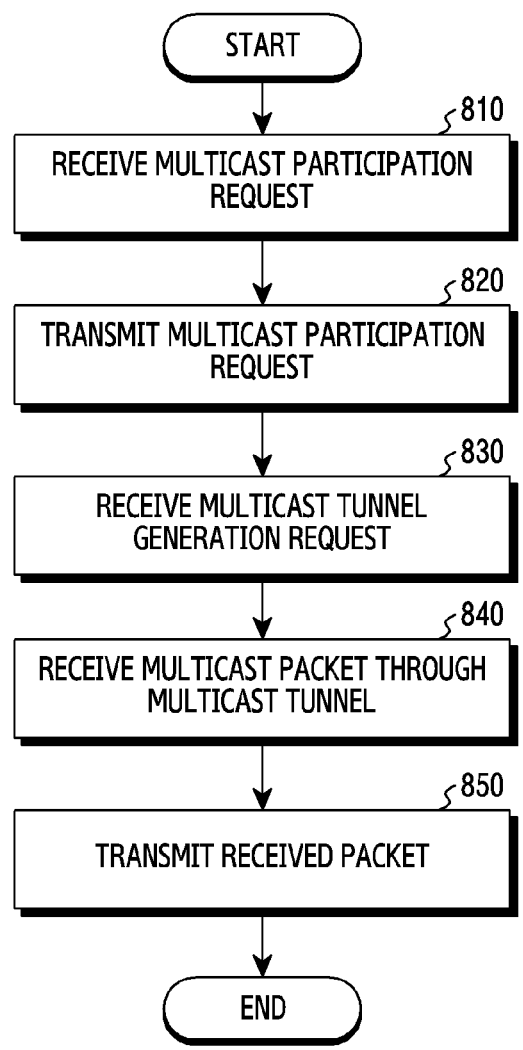
FIG. 8 illustrates the flow of an operation of providing a multicast service in a communication system according to various embodiments of the disclosure.

FIG. 8 illustrates the flow of an operation of providing a multicast service in a communication system according to various embodiments of the disclosure.

In operation 810, a gateway device 140 receives a multicast group participation message from a terminal 170, a terminal 170-1, or a terminal 170-2 through a communication session.

In operation 820, the gateway 140 analyzes, that is, snoops on, the multicast group participation message transmitted from the terminal and transmits the same to a service management apparatus 110. The service management apparatus 110 transmits a multicast service request message to an SDN control apparatus 120 on the basis of the multicast group participation message.

In operation 830, the gateway 140 receives a multicast tunnel generation message generated on the basis of the multicast group participation message from the service management apparatus 110. The multicast tunnel generation request message may include a multicast tunnel ID and/or a multicast tunnel IP address.

In operation 840, the gateway 140 receives multicast packets through a multicast tunnel generated to receive multicast packets from an SDN switch on the basis of the multicast tunnel generation message. The multicast packets are transmitted to the gateway 140 via the multicast tunnel generated from the SDN switch 130 controlled by the SDN control apparatus 120 on the basis of the multicast service request message. The multicast service request message may include information, such as the multicast tunnel ID, the multicast tunnel IP address, a multicast IP address, and/or the ID of the communication session.

In operation 850, the gateway 140 transmits the received multicast packets to the terminal having received the multicast group participation message through the communication session mapped to the multicast tunnel.

Figure 9:
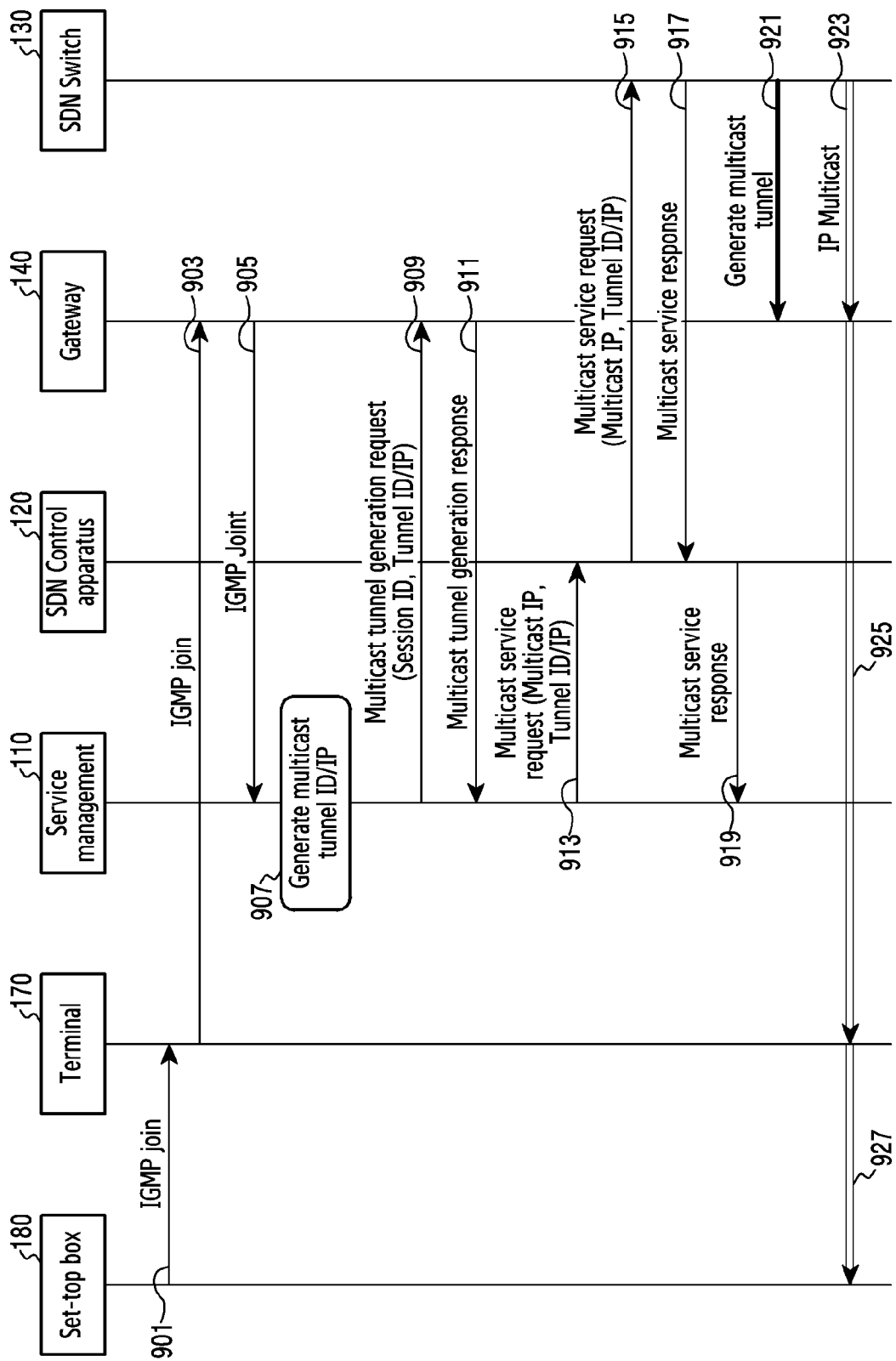
FIG. 9 illustrates the flow of an operation of providing a multicast service in a communication system according to various embodiments of the disclosure.

FIG. 9 illustrates the flow of an operation of providing a multicast service in a communication system according to various embodiments of the disclosure.

In operation 901, a terminal 170 (e.g., the terminal 170-1 or the terminal 170-2) receives a multicast group participation request message, for example, a membership report of an IGMP message, from a set-top box 180 (e.g., the set-top box 180-1 or the set-top box 180-2). The IGMP message may include information about a multicast group which the set-top box 180 joins through the terminal 170 among a plurality of multicast group, that is, a specific multicast IP address (e.g., a 32-bit IPv4 multicast group address).

In operation 903, the terminal 170 checks the received multicast group participation request message, that is, the IGMP message, generates an uplink (UL) communication session on the basis of IP communication session information, and transmits the received IGMP message to a gateway 140 through the communication session. In this case, the terminal 170 may generate a multicast session, may transmit the IGMP message via an uplink (UL) through the multicast session, and may receive a multicast IP packet via a downlink (DL) through the multicast session.

In operation 905, upon receiving the IGMP message, the gateway 140 checks the IGMP message by snooping on the IGMP message according to an IGMP protocol analysis function, inserts the IGMP message as content of a signaling message, and transmits the signaling message along with the ID of the multicast session in which the IGMP message is transmitted to a service management apparatus 110, thereby reporting that the IGMP message for a multicast group participation request is received from the terminal 170. In this case, the gateway 140 may record, for example, a communication session ID (or port ID) with the terminal 170 and the multicast IP address in a table (e.g., an IGMP snoop table).

In operation 907, upon receiving the signaling message from the gateway 140, the service management apparatus 110 parses the message to analyze the IGMP multicast group participation message included in the content of the message and generates a multicast tunnel ID and a multicast tunnel IP address in order to generate a multicast tunnel for providing a multicast service to a terminal requesting participation in a multicast group. The multicast tunnel IP address may be an address of a multicast tunnel terminating at the gateway 140. In addition, the multicast tunnel IP address may be an IP address of a tunnel starting from an SDN switch 130. The service management apparatus 110 obtains a communication session ID between the terminal 170 and the gateway 140 and a multicast IP address.

In operation 909, the service management apparatus 110 generates a multicast tunnel generation request message and transmits the message to the gateway 140. The multicast tunnel generation request message may be generated using, for example, a signaling message between the service management apparatus 110 and the gateway 140. The multicast tunnel generation request message includes the multicast tunnel ID and the multicast tunnel IP address. The multicast tunnel generation request message may include the session ID of the communication session in which the IGMP message is transmitted from the terminal 170 to the gateway 140. The gateway 140 may match the generated multicast tunnel with the communication session. That is, the gateway 140 may allocate multicast IP packets received through the generated multicast tunnel to a downlink (DL) of the communication session (or port number) to the terminal 170 and may transmit the same to the terminal 170, for example, by referring to the table or on the basis of multicast tunnel generation request message received from the service management apparatus 110.

In operation 911, upon receiving the multicast tunnel generation request message, the gateway 140 checks the multicast tunnel generation request message and transmits a response message, for example, in the form of a signaling message, to the service management apparatus 110.

In operation 913, the service management apparatus 110 generates a multicast service request message and transmits the multicast service request message to an SDN control apparatus 120. The multicast service request message may include the multicast IP address, the multicast tunnel ID, and the multicast tunnel IP address.

In operation 915, upon receiving the multicast service request message, the SDN control apparatus 120 may generate and transmit a control signal to the SDN switch 130 so that the SDN switch 130 generates the multicast tunnel to the gateway 140 on the basis of the multicast tunnel ID and the multicast tunnel IP address included in the multicast service request message. The control signal may also include the multicast IP address.

In operation 917, the SDN switch 130 transmits a response signal in response to reception of the control signal from the SDN control apparatus 120. In operation 919, the SDN control apparatus 120 transmits a multicast service response signal to the service management apparatus 110 according to the response signal from the SDN switch 130. In operation 921, the SDN switch 130 generates a multicast tunnel which starts from the SDN switch 130 and terminates at the gateway 140 on the basis of information included in the control signal. In operation 923, the SDN switch 130 transmits the multicast IP packets designated by the multicast IP address received from the SDN control apparatus 120 to the gateway 140 through the generated multicast tunnel. In this case, the multicast IP packets may be transmitted by being encapsulated into packets including the multicast tunnel ID and the multicast tunnel IP address in a header. To this end, the SDN switch 130 may duplicate a multicast IP packet and may perform multicast tunneling using a tunneling technique, for example, generic routing encapsulation (GRE) or virtual extensible local area network (VxLAN), for transmitting a packet by overlaying.

In operation 925, the gateway 140 transmits the multicast packets received through the multicast tunnel to the terminal 170 through a downlink (DL) multicast session of the communication session matched with the multicast tunnel in operation 909 and operation 911. In operation 927, upon receiving the multicast packets, the terminal 170 transmits the multicast packets to the set-top device 180 having transmitted the IGMP message.

Figure 10:
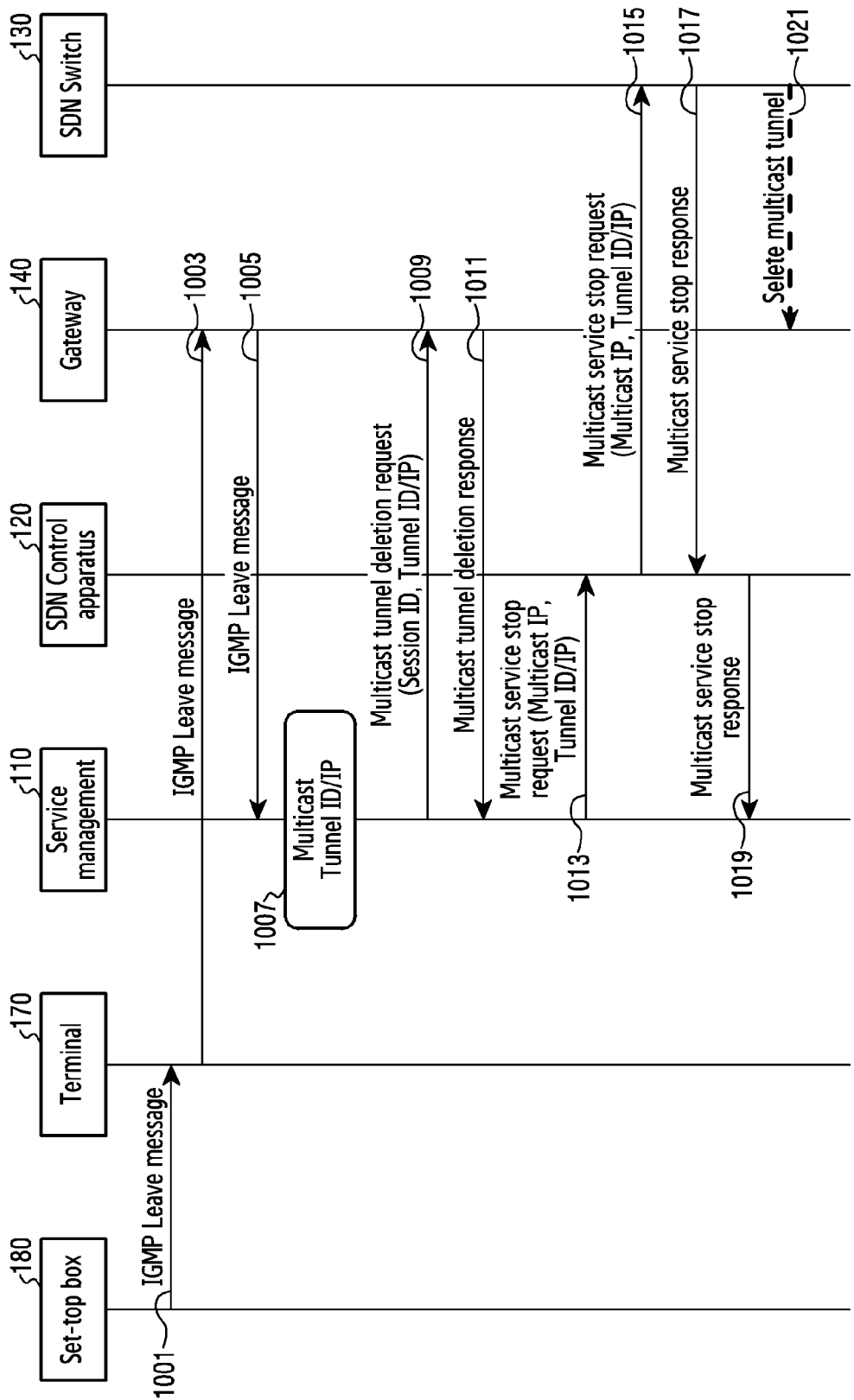
FIG. 10 illustrates the flow of an operation of stopping providing a multicast service in a communication system according to various embodiments of the disclosure.

FIG. 10 illustrates the flow of an operation of stopping providing a multicast service in a communication system according to various embodiments of the disclosure.

In operation 1001, a terminal 170 (e.g., the terminal 170-1 or the terminal 170-2) receives a multicast group leave request message), for example, an IGMP leave message (leave group), from a set-top box 180 (e.g., the set-top box 180-1 or the set-top box 180-2). The IGMP leave message may include information about a multicast group which the set-top box 180 leaves through the terminal 170.

In operation 1003, the terminal 170 checks the received multicast group leave request message, that is, the IGMP message, and transmits the received IGMP message to a gateway 140 through an uplink (UL) multicast session.

In operation 1005, upon receiving the IGMP message, the gateway 140 checks the IGMP message by snooping on the IGMP message, inserts the IGMP message as content of a signaling message, and transmits the signaling message along with the ID of the multicast session in which the IGMP message is transmitted to a service management apparatus 110, thereby reporting that the IGMP message for a multicast group leave request is received from the terminal 170. Here, the gateway 140 may delete information stored in an IGMP snoop table, or may delete the information after operation 1009.

In operation 1007, upon receiving the signaling message from the gateway 140, the service management apparatus 110 parses the message to analyze the IGMP multicast group leave message included in the content of the message and deletes a multicast tunnel ID and a multicast tunnel IP address, which are previously generated and stored, in order to terminate a multicast service for the terminal 170 making a multicast group leave request.

In operation 1009, the service management apparatus 110 generates a multicast tunnel deletion request message and transmits the message to the gateway 140. The multicast tunnel deletion request message may be generated using, for example, a signaling message between the service management apparatus 110 and the gateway device 140. The multicast tunnel deletion request message includes the multicast tunnel ID and the multicast tunnel IP address and may include the session ID (or port ID) of the communication session in which the IGMP message is transmitted from the terminal 170 to the gateway 140.

In operation 1011, upon receiving the multicast tunnel deletion request message, the gateway 140 checks the multicast tunnel deletion request message, deletes information about a multicast tunnel matched with the communication session, and transmits a response message, for example, in the form of a signaling message, to the service management apparatus 110.

In operation 1013, the service management apparatus 110 generates a multicast service stop message and transmits the multicast service stop message to an SDN control apparatus 120. The multicast service stop message may include a multicast IP address, the multicast tunnel ID, and the multicast tunnel IP address.

In operation 1015, upon receiving the multicast service stop message, the SDN control apparatus 120 may generate and transmit a control signal to an SDN switch 130 so that the SDN switch 130 deletes the multicast tunnel to the gateway 140 on the basis of the multicast tunnel ID and the multicast tunnel IP address included in the multicast service stop message. The control signal may also include the multicast IP address.

In operation 1017, the SDN switch 130 transmits a response signal to the SDN control apparatus 120 in response to reception of the control signal from the SDN control apparatus 120. In operation 1019, the SDN control apparatus 120 transmits a multicast service stop response signal to the service management apparatus 110 according to the response signal from the SDN switch 130. In operation 1021, the SDN switch 130 deletes the multicast tunnel which starts from the SDN switch 130 and terminates at the gateway 140 on the basis of information included in the control signal and stops transmitting a multicast packet.

According to various embodiments, a 5G communication system may provide a multicast service to a customer-premises equipment (CPE) by extending the range of services using FWA.

According to various embodiments, a 5G communication system may provide a multicast service using an existing infrastructure, such as an existing set-top box and an IPTV server.

According to various embodiments, a 5G communication system may provide a multicast service using SDN. Therefore, it is possible to efficiently utilize a virtualization equipment server supporting a multicast service.

According to various embodiments, a 5G communication system may apply a multicast overlay function to a user-plane function.

According to various embodiments, a 5G communication system may apply a multicast overlay function to a user plane, in which a packet duplication function for multicast transmission may be separately applied with a hardware device.

According to various embodiments, a 5G communication system may provide a packet duplication function for providing a multicast service using an SDN switch.

According to various embodiments, a 5G communication system may provide a multicast service by performing a packet replication function and a tunneling function for multicast forwarding of a duplicated packet by overlaying using an SDN switch.

According to various embodiments, a control plane and a user plane of a 5G core network are functionally separated, and a function provided by SDN and hardware are combined, thereby maximizing gains from the separation of the control plane and the user plane and reducing additional costs for a 5G communication system.

According to various embodiments, a control plane and a user plane of a 5G core network are functionally separated, and a function provided by SDN and hardware are combined, thereby providing various services through a 5G communication system without causing loads on virtualization equipment and thus preventing an increase in cost for establishing the user plane.

According to various embodiments, it is not necessary to install separate hardware for a virtualization server, thus reducing the number of servers of virtualization equipment for supporting a multicast service and efficiently operating existing server resources.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A service management apparatus in a wireless communication system, the service management apparatus comprising:
a transceiver; and
at least one processor operably coupled to the transceiver and configured to:
receive, from a user plane function (UPF), an internet group management protocol (IGMP) join message including a multicast internet protocol (IP) address and an identification (ID) of a multicast session between a terminal and the UPF,
generate information on a multicast tunnel between the UPF and a software defined network (SDN) switch based on the IGMP join message, wherein the information on the multicast tunnel includes an ID of the multicast tunnel and an IP address of the multicast tunnel,
transmit, to the UPF, a multicast tunnel generation request message including the ID of the multicast session and the information on the multicast tunnel,
generate a service rule for transmitting multicast packets,
transmit the service rule to an SDN controller for controlling the SDN switch based on the service rule, and
transmit, To the SDN switch through the SDN controller, a multicast service request message including the multicast IP address and the information on the multicast tunnel,
wherein the multicast IP address is used to transmit multicast packets duplicated at the SDN switch from the SDN switch to the UPF through the multicast tunnel generated by the SDN switch, wherein the multicast tunnel starts from the SDN switch and terminates at a gateway based on information included in the multicast service request message, and
wherein the ID of the multicast session is used to transmit the multicast packets duplicated at the SDN switch from the UPF to the terminal through the multicast session.

2. The service management apparatus of claim 1, wherein the at least one processor is further configured to:
obtain the multicast IP address from the IGMP join message.

3. The service management apparatus of claim 2, wherein the at least one processor is further configured to:
receive, from the UPF, an IGMP leave message;
generate a multicast tunnel deletion request message including the ID of the multicast session and the information on the multicast tunnel;
transmit, to the UPF, the multicast tunnel deletion request message;
generate a multicast service stop message including the multicast IP address and the information on the multicast tunnel; and
transmit, to the SDN controller, the multicast service stop message.

4. The service management apparatus of claim 3, wherein the multicast service stop message comprises information for deleting the multicast tunnel from the SDN switch controlled by the SDN controller to the UPF.

5. A method performed by a service management apparatus in a wireless communication system, the method comprising:
receiving, from a user plane function (UPF), an internet group management protocol (IGMP) join message including a multicast internet protocol (IP) address and an identification (ID) of a multicast session between a terminal and the UPF;
generating information on a multicast tunnel between the UPF and a software defined network (SDN) switch based on the IGMP join message, wherein the information on the multicast tunnel includes an ID of the multicast tunnel and an IP address of the multicast tunnel;
transmitting, to the UPF, a multicast tunnel generation request message including the ID of the multicast session and the information on the multicast tunnel;
generating a service rule for transmitting multicast packets;
transmitting the service rule to a SDN controller for controlling the SDN switch based on the service rule; and
transmitting, to the SDN switch through the SDN controller, a multicast service request message including the multicast IP address and the information on the multicast tunnel,
wherein the multicast IP address is used to transmit multicast packets duplicated at the SDN switch from the SDN switch to the UPF through the multicast tunnel generated by the SDN switch, wherein the multicast tunnel starts from the SDN switch and terminates at a gateway based on information included in the multicast service request message, and
wherein the ID of the multicast session is used to transmit the multicast packets duplicated at the SDN switch from the UPF to the terminal through the multicast session.

6. The method of claim 5, further comprising:
obtaining the multicast IP address from the IGMP join message.

7. The method of claim 6, further comprising:
receiving, from the UPF, an IGMP leave message;
generating a multicast tunnel deletion request message including the ID of the multicast session and the information on the multicast tunnel;
transmitting, to the UPF, the multicast tunnel deletion request message;
generating a multicast service stop message including the multicast IP address and the information on the multicast tunnel; and
transmitting, to the SDN controller, the multicast service stop message.

8. The method of claim 7, wherein the multicast service stop message comprises information for deleting the multicast tunnel from the SDN switch controlled by the SDN controller to the UPF.

9. A user plane function (UPF) in a wireless communication system, the UPF comprising:
a transceiver; and
at least one processor operably coupled to the transceiver and configured to:
receive, from a terminal, an internet group management protocol (IGMP) join message with an identification (ID) of a multicast session between the terminal and the UPF,
transmit, to a service management apparatus, the IGMP join message with the ID of the multicast session between the terminal and the UPF,
receive, from the service management apparatus, a multicast tunnel generation request message including the ID of the multicast session and information on a multicast tunnel between the UPF and a software defined network (SDN) switch, wherein the information on the multicast tunnel includes an ID of the multicast tunnel and an IP address of the multicast tunnel, receive, from the SDN switch, multicast packets duplicated at the SDN switch through the multicast tunnel based on the multicast IP address, wherein the multicast tunnel is generated by the SDN switch, and transmit, to the terminal, the multicast packets duplicated at the SDN switch through a downlink of the multicast session, wherein the multicast session is matched with the multicast tunnel based on the ID of the multicast session.

10. The UPF of claim 9, wherein the at least one processor is further configured to:

receive, from the terminal, an IGMP leave message through the multicast session, transmit, to the service management apparatus, the IGMP leave message, and receive, from the service management apparatus, a multicast tunnel deletion request message including the ID of the multicast session and the information on the multicast tunnel.

\* \* \* \* \*